Aug. 14, 1934.      W. B. FOSTER      1,970,422
BUTT JOINT CONSTRUCTION
Filed Dec. 29, 1932      3 Sheets-Sheet 1
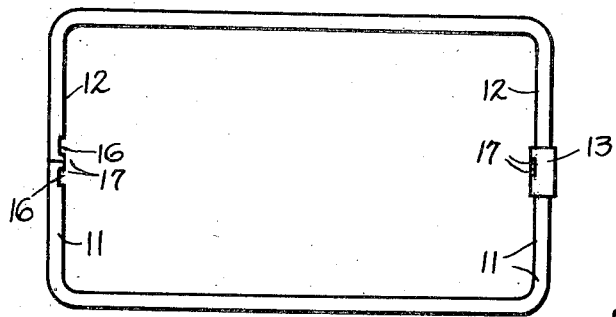
Fig. 1
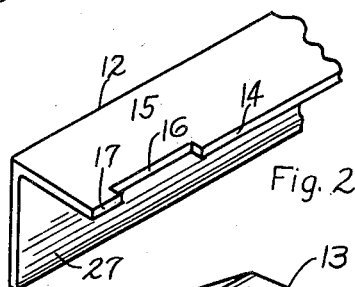
Fig. 2
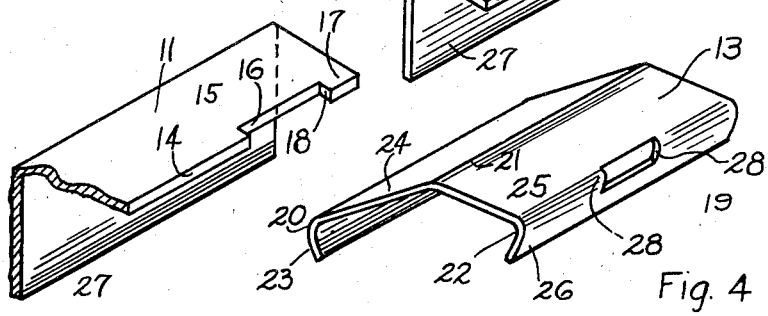
Fig. 3
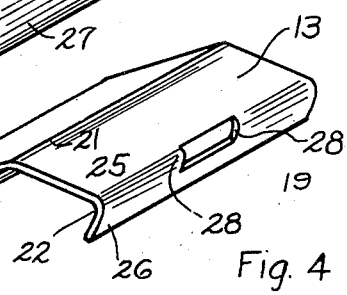
Fig. 4
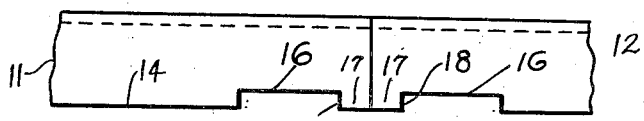
Fig. 5
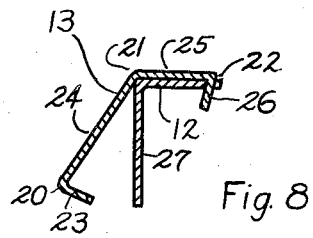
Fig. 6
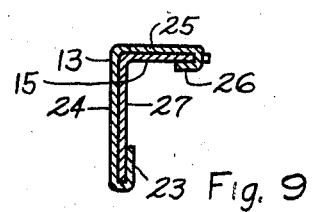
Fig. 8
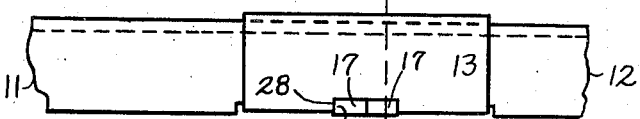
Fig. 7
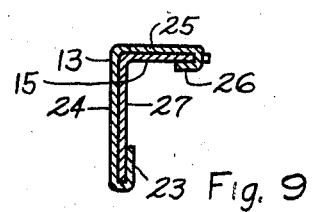
Fig. 9
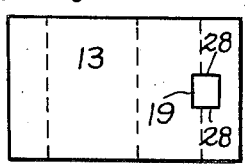
Fig. 9½
INVENTOR
William B. Foster
BY Martin & Rendell
ATTORNEYS Aug. 14, 1934.    W. B. FOSTER    1,970,422
BUTT JOINT CONSTRUCTION
Filed Dec. 29, 1932    3 Sheets-Sheet 2
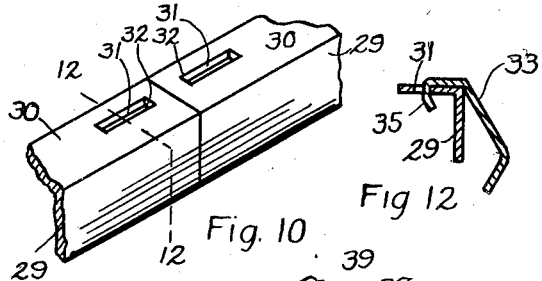
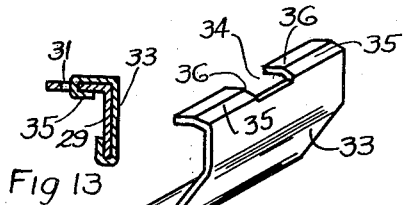
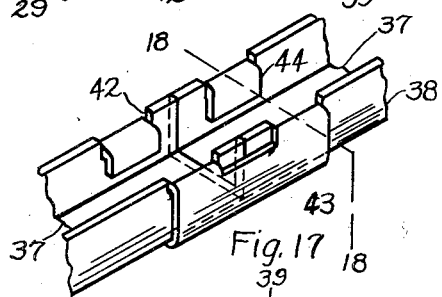
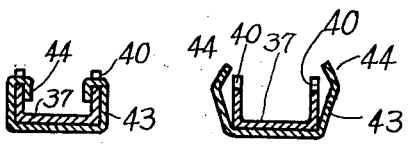
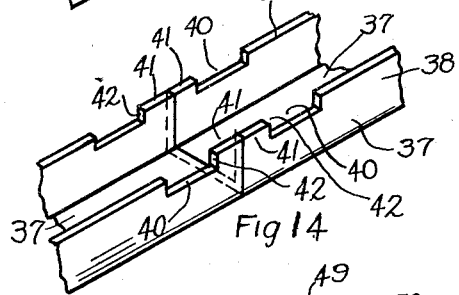
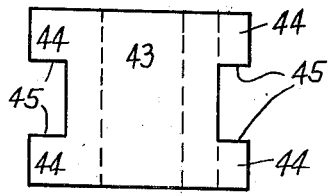
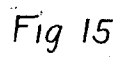
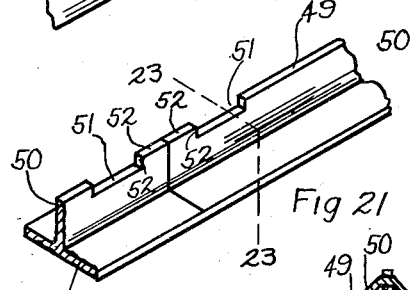
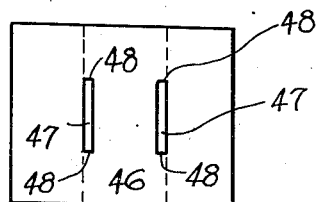
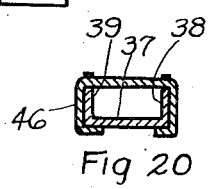
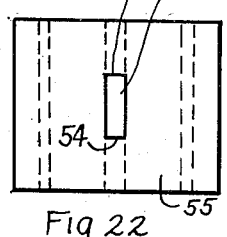
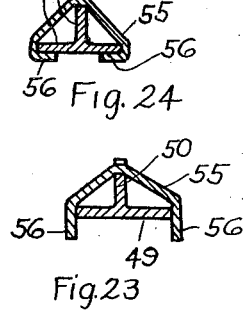
INVENTOR
William B. Foster
BY Martin & Rendell
ATTORNEYS

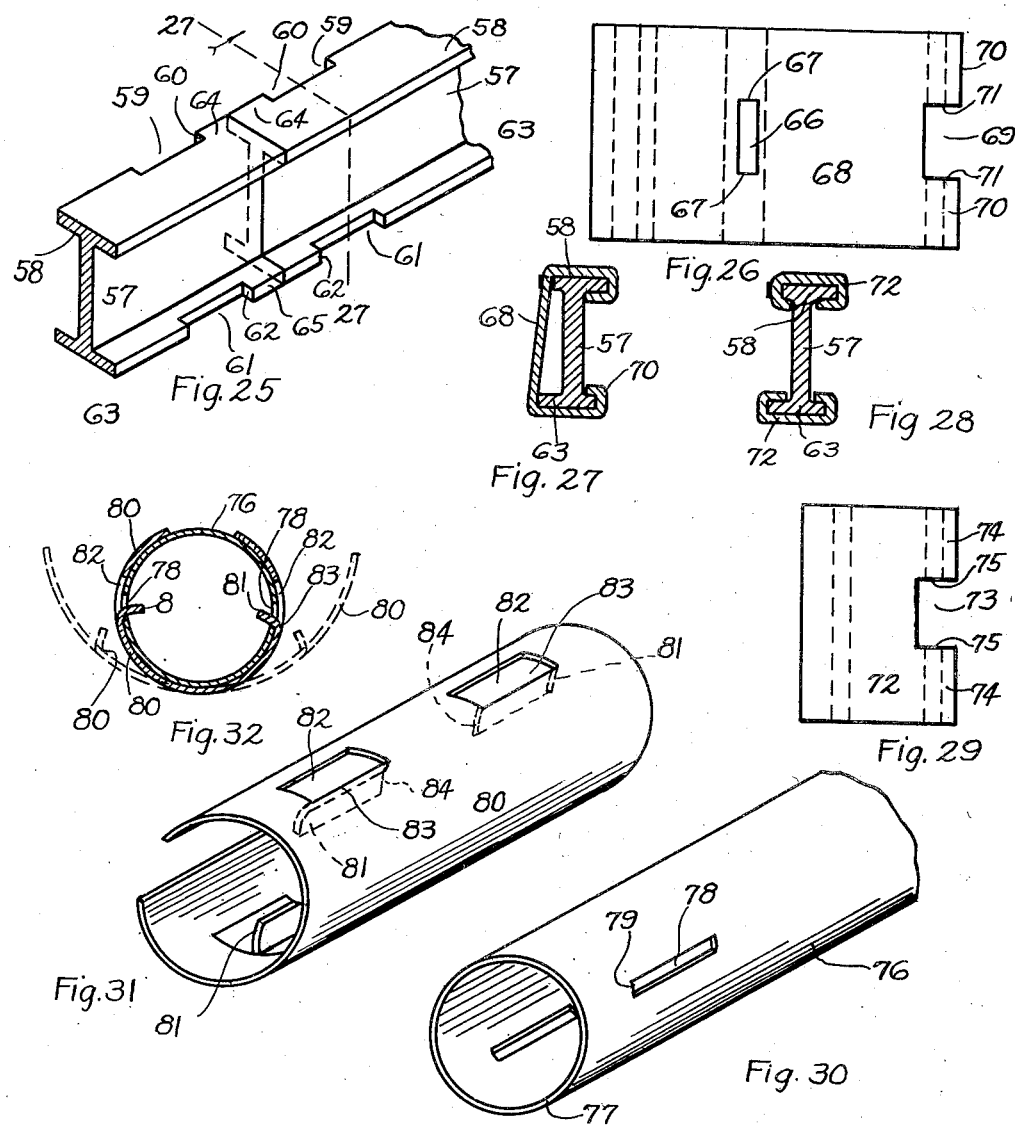

Patented Aug. 14, 1934 1,970,422

UNITED STATES PATENT OFFICE 1,970,422

BUTT JOINT CONSTRUCTION

William B. Foster, Utica, N. Y., assignor to Foster Brothers Manufacturing Company, Utica, N. Y., a corporation of New York Application December 29, 1932, Serial No. 649,364

2 Claims. (Cl. 189—36)

This invention relates to butt joints for metal construction members such as angle iron, channel iron and other structure members such as those that are T-shaped or I-shaped in cross section and even construction members that are tubular in cross section.

The purpose of my present invention is to provide a new and improved butt joint for such metal construction members and particularly to provide a joint which is made without rivets or bolts and without welding and by the use ordinarily, but not necessarily of, a single coupling member of simple and economical construction adapted to be readily formed and shaped to the desired stage of the unit and then adapted to be easily but permanently attached to the portions of two such metal construction members that have been placed in abutting position and which abutting construction members have no special shaping of the ends thereof except the providing of an aperture in each construction member spaced from the butt extremities of each member so as to provide a shoulder to receive a projection upon the coupling member.

A further purpose is to provide a butt joint construction where the metal construction members have to be treated or shaped or worked over to the minimum extent to receive said coupler so as not only to require little work upon the construction members but also so as not to weaken in any appreciable degree the strength or rigidity of said construction members and further to provide a butt joint of the type mentioned where the coupler member with slight modifications of its size and form may be applied to various forms and types and sizes of construction members so as to obtain a joint construction embodying this invention and which has the features of not only holding the construction members in abutting alignment with strength and rigidity but also of giving said joint sufficient strength to resist relative endwise displacement of the metal construction members.

Further purposes and advantages of the invention will appear from the specification and claims herein.

In the first figure of the drawings there is shown a pair of butt joints of one form of my invention as applied to hold the two U-shaped members of a bed spring frame in place. This illustration it will be understood is made only to illustrate a typical use of a joint embodying this invention and not as limiting my invention to use upon bed spring frames or spring bed structures. It will be obvious that the invention in many of its forms or equivalent forms can be used in a great variety of places.

Fig. 1 is a top view on a greatly reduced scale of a bed spring frame equipped at one end with one form of a completed joint embodying this invention and at the other end of the frame having the ends of the two pieces of angle iron of the frame shaped to receive the coupling member or coupler.

Figs. 2 and 3 are isometric projections respectively of the two pieces of angle-iron that are to be connected by the butt joint formed according to what I will call the first form of this invention.

Fig. 4 is a cabinet projection of the coupling member or coupler as shaped and originally applied to the ends of the angle-iron members shown in Figs. 2 and 3.

Fig. 5 is a top view of the two ends of the two pieces of angle-iron shown in Figs. 2 and 3 as brought together preliminary to applying the coupler.

Fig. 6 is a similar view of said angle-irons with the coupler in the position it occupies when first applied to the pieces of angle-iron.

Fig. 7 is a top view of the parts shown in Fig. 6 after the coupler has been closed and the joint completed.

Fig. 8 is a vertical sectional view on line 8—8 of Fig. 6.

Fig. 9 is a vertical sectional view on line 9—9 of Fig. 7.

Fig. 9½ is a pattern view on a reduced scale of a piece of sheet metal cut and punched to form a coupler for this first form of my invention, dotted lines being shown across the width of the pattern to indicate where the bends or folds are to be subsequently made.

Fig. 10 is an isometric view of the abutted end portions of two angle iron members that are to be connected by a coupler to form a butt joint of another or the second form of this invention.

Fig. 11 is a perspective view of the coupler particularly adapted for use with the parts shown in Fig. 10.

Figs. 12 and 13 are cross-sectional views similar to Figs. 8 and 9 respectively but having the coupler shown in Fig. 11 applied to the two angle iron rails shown in Fig. 10, said sectional views being on line 12—12 of Fig. 10.

Fig. 14 is an isometric projection of the two abutted end portions of two channel-shaped construction members shaped to form a butt joint illustrating a further or third form of my invention.

Fig. 15 is a pattern or plan view of the coupler adapted to be used with the channel iron members shown in Fig. 14.

Fig. 16 is a cross sectional view of this coupler as applied to the channel members of Fig. 14.

Fig. 17 is an isometric projection of the two channel members of Fig. 14 after the coupler has been applied and bent to completed form to make a joint of this type.

Fig. 18 is a cross sectional view on line 18—18 of Fig. 17.

Fig. 19 is a pattern or plan view of a coupling members adapted to be applied to channel members of the form shown in Fig. 14 and Fig. 20 is a cross-sectional view of this modified form of coupler after the butt joint has been completed to form this further method or fourth form of this invention.

Fig. 21 is an isometric projection of the abutted ends of two T-shaped construction members shaped and assembled preparatory to forming a further modified or fifth form of this invention.

Fig. 22 is a plan or pattern view of the coupler especially adapted to be used with the T-shaped members shown in Fig. 21.

Fig. 23 is a cross-sectional view as on line 23—23 of Fig. 21 showing the coupler as preliminarily formed and first applied to the T-shaped members of Fig. 21 and Fig. 24 is a similar cross sectional view of said parts after the joint has been completely assembled by bending the coupler.

Fig. 25 is an isometric projection of the abutted ends of two I-shaped metal construction members shaped and assembled to illustrate a still further or sixth form of my invention.

Fig. 26 is a pattern view of one form of a coupler that is particularly adapted to be used with the I-shaped members of Fig. 25.

Fig. 27 is a cross-sectional view showing the completed joint formed by applying the coupler of Fig. 26, to the parts shown in Fig. 25, the section being on line 27—27 of Fig. 25.

Figs. 28 and 29 illustrate a further or seventh form of my invention; Fig. 28 being a transverse sectional view similar to Fig. 27 but using two special couplers of which Fig. 29 is a plan view.

Fig. 30 is a cabinet projection of one of two similar tubular construction members that may be used according to an eighth modified form of my invention.

Fig. 31 shows a cabinet view of the special coupling member to be used with two of the tubes shown in Fig. 30.

Fig. 32 is a transverse sectional view showing the joint formed by the parts shown in Figs. 30 and 31. In Fig. 32 the full lines show the position of the parts when the joint is completed and the dotted line position of the coupler in an intermediate state of application.

Referring to the drawings in a more particular description and first to the first form of the invention shown in Figs. 1 to 9½ it will be seen that this joint construction is composed of the opposing ends of the two pieces of angle-iron 11 and 12 which are to be connected and the coupling member or coupler 13.

The ends of the two angle-irons 11 and 12 that are to be connected are shaped preferably by the ends being square so as to abutt each other in alignment closely. The free edge 14 of the corresponding web, say the horizontal web 15 of each angle-iron is provided with a shallow but relatively long recess 16. These recesses are spaced from the end of each of said webs leaving on said web a lug 17 of the original metal and extending to the near end of the angle iron. The face of this lug towards the recess 16 forms a shoulder 18 which is at a definite distance from the end of the angle-iron for the purpose hereafter explained.

The coupling member 13 is formed from a suitable piece of sheet metal of the proper thickness and strength according to the size and character of the angle-irons or other construction members being connected. This coupler when originally formed from sheet metal will be approximately of the proportion and shape shown by the pattern view Fig. 9½ and at this stage of its formation it is provided near one end with a crosswise extending aperture 19. The length of the aperture equals the length of the two lugs 17 of the pair of angle-irons that are to be connected or in other words the length of said aperture equals the distance between the two shoulders 18 of the angle-irons when brought together as shown in Fig. 5. The partly formed coupler shown in Fig. 9½ is then bent crosswise along the three dotted lines indicated in Fig. 9½ so as to form the three bends 20, 21 and 22 indicated particularly in Figs. 4 and 8 of the drawings and dividing the coupler into four zones or plates 23, 24, 25 and 26. The angle at the central bend 21 is considerably greater than a right angle while the angles formed at the bends 20 and 22 are preferably and conveniently slightly less than a right angle. The coupler is now ready to be placed in position upon a pair of abutted angle-irons arranged and shaped as shown in Figs. 2 to 5. The coupling is placed upon said pair of angle-irons as shown particularly in Figs. 6 and 8; that is with one of the large zones or plates, namely plate 25 of the coupler resting down upon the outside or top face of the horizontal web 15 of both angle-irons with the two lugs 17 extending into and commonly projecting slightly through the single aperture 19 of the coupling. The material of the coupler at the opposite ends of the aperture 19 along the bend 22 fits down into the two shallow recesses of the opposite angle-irons and the narrow zone 26 beyond this bend faces slightly towards the inner or lower surface as the parts are shown in the drawings of the horizontal webs 15 and the other wide zone or plate 24 of the coupler extends down outside the vertical web 27 of the two angle-irons, but as yet is spaced therefrom more or less at the angle indicated in Fig. 8.

It will be understood that in any set of parts to be formed into one of these joint constructions the two lugs 17 and the aperture 19 to be entered by said lugs will be so proportioned and formed as to make a relatively tight fit of the shoulders 18 of said lugs against the opposite ends 28 of the aperture 19. The necessity for this is that the engagement of these shoulders of the lugs against the ends of said aperture of the coupler is relied upon to positively hold the two pieces of angle-iron closely in abutting position when the coupler has been fully assembled upon the pieces of angle iron. In order to prevent sag, the strength of the coupler at the joint is at least equal to that of the angle.

The next step or more properly series of steps in assembling the coupler is to bend the central angle 21 from the obtuse angle shown in Fig. 8 to the right angle shown in Fig. 9; that is so that the wide zone 24 will be flat against the outer surface of the vertical web 27 of both pieces of angle-iron. During this movement the narrow zone 23 at the free edge of the wide portion 24 of the coupler passes closely beneath the lower or free edge of the vertical web that is the unrecessed web 27 of the two pieces of angle-iron and thereafter the part of said zone or flange 23 projecting beyond or to the inner side of the vertical web 27 is turned closely against the said inner surface of said web 27 as shown in Fig. 9. Similarly, the projecting portion of the narrow zone or flange 26 projecting beyond the recesses 16 is bent over closely against the inner or under surface of the horizontal web 15 of both pieces of angle-iron.

It will now be seen that the two pieces of angle-iron are closely and tightly encircled by the coupling to the extent of the upper surface of the horizontal web and the outer surface of the vertical web and also about the two edges of the angle-iron and for an appreciable distance in from said free edges along both inner surfaces of the angle-irons. The main right angle bend in the coupling and the two U-shaped bends at the opposite ends of the coupling, that is the parts engaging the edges of the angle-iron, make the coupling very rigid and stiff to prevent any tendency of strain upon the angle-irons bending or distorting the coupler. Longitudinal movement of the angle irons away from each other is prevented positively as already mentioned by the engagement of the shoulders 18 of lugs 17 with the ends of the aperture 19. As the aperture 19 is a relatively small narrow hole in integral metal this part of the coupler forms a link well adapted to hold the two angle-irons from relative lengthwise movement apart from each other. It will be understood further that the bending of the coupler from the position and shape shown in Figs. 4 and 8 to the position and shape shown in Fig. 9 makes a tight contact and a frictional engagement between the encircling coupling and the engaged faces and edges of the two pieces of angle-iron and thus helps to form a very rigid joint free from initial looseness and well adapted to retain such rigidity permanently.

It will be understood that for the sake of definiteness and for illustrative purposes I have shown in the drawings and described in the specification herein the recesses 16 as being located on the free edge of the horizontal web but it is obvious that these recesses and the lugs 17 may be upon the free edge of the vertical web and that this could be so whether the vertical web is directed downwardly as the parts are shown in the drawings herein or whether the vertical web extended upwardly from the horizontal web. It is obvious that this last change of location would amount simply to a turning of the joint shown in Fig. 9 one hundred eighty degrees to the right or left on the longitudinal axis of the joint.

In the second form of joint embodying this invention and shown in Figs. 10 to 13, the angle iron members 29 have on one web, say the horizontal web 30, an aperture which instead of a recess as in the former exemplification of the invention is an elongated hole 31 spaced back from the abutting extremities of the angle iron construction members 29 so as to leave the faces 32 of each hole nearest the extremity of the construction member. The coupler 33 is formed in the main as in the first form of my invention, but instead of having simply a hole the coupler has a slot 34 cut or formed in the proper edge of the coupling so as to leave on each side thereof a projecting finger 35. The edge of the original metal of the coupling at the opposite sides of this slot form faces 36. The coupler 33 having been cut in the proper shape and form and preferably bent up to the intermediate stage shown in Fig. 11, is placed in position upon the abutted angle irons 29 by passing the fingers 35 into the two holes 31 of the two angle iron members bringing the three parts to the relative position shown in Fig. 12. It will be understood that the holes 31 are so placed relative to the extremities of the two angle construction members as to have the faces 32 closely engaged by the respective faces 36 of the fingers 35 of the coupler. The fitting of these parts in this way it will be obvious presents a positive mechanical means for preventing relative endwise displacement of the two members 29 after the bends preliminarily formed in the coupling 33 as shown in Fig. 11 have been further bent to have the different zones of the coupler engage the outer surfaces of the two webs of the angle irons and with the uncut lower portion of the coupler bent around the lower or free edge of the vertical web and engage the inner surface of this web. In a similar way the ends of the fingers 35 that project through the holes 31 are bent inwardly to engage the under or inner surface of the horizontal web 30. The parts will then assume the relative position shown in the sectional view Fig. 13. It will be seen that this coupling by engaging the stated surfaces and edges of the two angle members will hold said members in direct alignment and any possible endwise movement of said angle members will be prevented by the engagement of the faces 36 of the coupler against the faces 32 of the angle members. It will be seen that this second form is in the main an equivalent construction of the first form and that the forming of the coupler with fingers thereon to project into holes in the body of a web of the angle iron still gets faces upon the angle iron that face away from the abutting extremities to be engaged by faces of the coupler facing towards the abutting edges of the joint.

In the form of my invention shown in Figs. 14 to 18 the construction members are channel-shaped members 37 and in both flanges 38 and 39 there is formed or made a recess 40 similar to that described with the angle iron as shown in the first form of the invention. These recesses 40 leave integral projecting lugs 41 on each flange adjacent the abutting ends of the channel members ready to take the strain upon the shoulders 42.

The coupler 43 for this third form of butt joint is preferably formed from a suitable piece of sheet metal cut or formed to the shape shown in the pattern view Fig. 15 so as to have two pairs of fingers 44 arranged to enter the four recesses 40 and with said fingers 44 having their inner edges form abutments 45 to engage respectively the four shoulders 42. Preferably previous to the parts being assembled the coupler 43 will be bent to the transverse shape indicated in Fig. 16, that is the coupler will be partly bent at the lines where the ultimate bends are to be made so as to aid in placing the coupler upon the channel irons and leave only the minimum of further bending of the coupler that is required to then complete the joint into the form shown in Figs. 17 and 18. It will be noticed that this third form of my invention illustrates two variations over previous forms. One variation is that the co-operating shoulders 42 upon the construction members and the co-operating faces or abutments as 45 upon the coupler are formed from recesses in the flanges of the channel members and from recesses formed in two opposite edges of the coupler. In other words, these co-operating shoulders and abutments which prevent relative longitudinal displacement of the construction members brought together in the joint can be obtained without the use of a complete hole as in the coupler of the first form of my invention and without the use of a complete hole as in the angle bars of the second form of my invention.

The second variation illustrated in this third form of my invention is that in the complete joint there are four co-operating shoulders 42 and four co-operating abutments 45 instead of two such co-operating shoulders and faces or abutments as were used in the first and second form of my invention. It will be seen that this is brought about through both flanges of the two channel-shaped members being positively held together against longitudinal displacement as compared with one flange of the angle iron being so positively directly held as in the two forms of my invention designated herein as the first and second forms. It will be obvious, however, that if desired only one set of the flanges of the channel-shaped members may be provided with holding shoulders and then only one set of co-operating abutments will be required upon the coupler. In that event, the coupler would resemble more the coupler shown in Fig. 11.

Figs. 19 and 20 illustrate a fourth form of the invention. This is a slight modification of the third form of my invention in that the coupler 46 is formed originally as shown in the plan view thereof, Fig. 19, with two oppositely placed elongated holes 47. This coupler is to be used with abutting channel shaped-members having the four upstanding lugs 41 and the four holding shoulders 42 as shown in Fig. 14. The holes 47 are shaped and formed to each receive an abutting pair of lugs 41 and the opposite ends of each hole 47 form an abutment 48 to engage one of the shoulders 42. It will be seen that this coupler 46 is placed with its central portion against the free edges of the two flanges of the channel-shaped member as shown in Fig. 20 and then the ends of the coupler are closed against the outer surfaces of the flanges of the channel-shaped members and the extremities are turned at right angles closely against the outer or lower surface of the main plate of the channel-shaped members. When the joint is completed it appears as shown in the transverse sectional view Fig. 20. It will be noted that this fourth modification gets four holding shoulders and four co-operating abutments and holds free edges of both flanges of the channel-shaped member from longitudinal displacement.

In Figs. 21-24 there is shown a fifth form of this invention. In this form the joint is used with T-shaped members 49 and the free end of the stem or upright 50 of the T-shaped members are provided with recesses 51 spaced back from the abutting ends of the construction members so as to provide the holding shoulders 52 on the lugs 52'. As originally made the coupling for this joint is shown in the pattern view thereof, Fig. 22, with a hole 53 shaped and sized to receive thereinto closely the two adjacent upstanding lugs 52'. The metal at the ends of the hole 53 form the co-operating abutments 54 to fit against the said shoulders 52. The partly bent coupler 55 will be placed upon the abutted T-shaped construction members as indicated in the transverse sectional view 23 with the lugs 52' projecting into the hole 53. Then the extremities 56 of the coupler will be bent in against the exterior or lower face of the plate of a T-shaped member as indicated in Fig. 24, completing the finishing of the joint.

Figs. 25-27 illustrate the sixth form or modification of my invention. In this construction the joint is formed by the two abutting ends of I-beams or members 57. In this form the top plate 58 of each member on the same side, say the further side, as seen in Fig. 25, is provided with an aperture in the form of a recess 59 providing a holding shoulder 60 which is spaced back from the extreme abutting ends of the construction member. A similar recess 61 with a holding shoulder 62 is provided upon one edge, say the near edge of the other or lower plate 63 of the I-beam members 57. The forming of the recesses 59 leave integral lugs 64 on said top plate and the forming of the recesses 61 upon the bottom plate leave integral lugs 65 upon said lower plate. The coupler for use with this sort of a joint is originally formed as shown in the pattern view thereof, Fig. 26. Towards the center of the coupler there is provided or formed the elongated hole 66 to receive thereinto the two lugs 64 of the top plate of the I-beam. The material of the coupler at the opposite ends of the hole 66 form the abutment 67 to closely engage the shoulders 60 of the top plate. Upon the proper end of this coupler 68 there is cut or formed a recess 69 leaving projecting fingers 70 on each side thereof, the inner edges of which form the abutments 71. The recess 69 is shaped to receivingly fit the pair of lugs 65 while the fingers 70 are to be turned or rolled into the recesses 61 of the lower plate. It will be obvious then that the abutment 71 will co-operate with the two shoulders 62 on the lugs 65 of the lower plate. The joint when completed by the proper bending and turning of the coupler 68 along the dotted lines of Fig. 26 will produce a joint as indicated in the cross-sectional view, Fig. 27.

In Figs. 28 and 29 is shown a seventh form of my invention. This is a modification of the construction shown in Figs. 25-27. In this seventh form the construction members to be joined are I-shaped members or beams as shown in Fig. 25 and said beams are provided with the recesses, lugs and holding shoulders as indicated in said Fig. 25. The variation consists in the use of two separate and similar couplers 72. These are originally formed as indicated in the pattern view thereof Fig. 27. Each one of these couplers is constructed to fit around the top or bottom plate of the I-shaped members 57. It will be seen that the coupler 72 accordingly needs to be in effect the right hand two-fifths of the coupler 68 shown in Fig. 26. In other words, the coupler 72 has at its proper edge a recess 73 leaving integral strong fingers 74 on each side thereof the inner edges of which form the abutments 75 to co-operate with the shoulders 60 of the top plate for one coupler while the said abutments 75 upon the lower coupler co-operate with the holding shoulder 62 of the lower plate of the I-beam. When the two couplers have been assembled on their respective top and bottom plates and folded thereabout to final position the joint in transverse section will appear as in Fig. 28. It is to be observed that in this variation of my invention two couplers are used to form one joint.

Figs. 30-32 illustrate my invention in a still further or eighth form of the invention. In this construction the construction members to be united by a butt joint are two similar tubular members 76 of which only one is shown in a cabinet projection view, Fig. 30. Spaced back from the end 77 of each tube 76 there are provided two longitudinally extending slots 78. The original material of the tube at the end of the slot 78 toward the end of the tube 77 forms the holding shoulder 79 in this construction. The slots 78 will preferably be spaced apart about half way the circumference of the tube 76. The coupler 80 for this joint is shown in cabinet projection in Fig. 31 in the shape it assumes when closed. When originally formed and first applied to the two ends of the tube 76, however, the coupler 80 will be more or less in the form of a semi-circle as indicated in the dotted lines in Fig. 32. The coupler 80 is provided with two spaced oppositely disposed pairs of longitudinally aligned inwardly projecting fingers 81. Preferably these will be formed by punching out three sides of holes 82 and bending the material so obtained inwardly along the line 83 at the fourth side of the hole to form the fingers 81. The coupler 80 will be assembled upon the abutting tubes by being first placed in the dotted line position of Fig. 2 and then having its curved portions wrapped closely about the outer surface of each tube. This will bring the four projecting fingers 81 into their respective cooperating slots 78 of the two tubes. The end of each finger 81 toward the abutting ends of the two tubes will form an abutment 84 closely engaging the holding shoulders 79 of each slot 78.

It will be obvious that many variations may be made by varying the different forms of my invention as herein illustrated without departing from the spirit of my invention as pointed out in the claims hereto annexed.

What I claim as new and desire to secure by Letters Patent is:

1. A butt joint construction for angle iron consisting of two pieces of similar angle-iron, having their opposing ends butted against each other and each having an edge of an aligned web provided with a shallow recess spaced from the near end of the angle-iron and leaving adjacent the end of the web a projecting lug and a sheet-metal coupling member bent intermediate its length to form two plates respectively fitting against the outer sides of the webs of the angle-iron, the end of one plate being bent about the edge and part way back upon the inner side of the unrecessed webs and the other end of the coupler being provided back from its extremity and intermediate its width with an aperture in length the same as the distance between the non-adjacent sides of said lugs and into which said lugs project, the parts of said plate beyond the ends of the aperture being bent closely into said notches and said plate beyond said bend engaging the inner side of the notched webs.

2. In combination two pieces of abutting angle-iron, each having an edge of an aligned web provided with a shallow recess spaced from the near end of the angle-iron and leaving adjacent the end of the web a projecting lug and a sheet-metal coupling member bent intermediate its length to form two plates respectively fitting against the outer sides of the webs of the angle-iron, the end of one plate being bent about the edge and part way back upon the inner side of the unrecessed webs and the other end of the coupler being provided back from its extremity and intermediate its width with an aperture in length the same as the distance between the non-adjacent sides of said lugs and into which said lugs project, the parts of said plate beyond the ends of the aperture being bent closely into said notches and said plate beyond said bend engaging the inner side of the notched webs.

WILLIAM B. FOSTER.